United States Patent [19]

Vanderlaan

[11] Patent Number: 4,548,089
[45] Date of Patent: Oct. 22, 1985

[54] ELECTRO-MECHANICAL DIRECT DRIVE VALVE SERVO SYSTEM WITH ROTARY TO LINEAR VALVE DRIVE MECHANISM

[75] Inventor: Robert D. Vanderlaan, Kalamazoo, Mich.

[73] Assignee: Pneumo Corporation, Boston, Mass.

[21] Appl. No.: 606,195

[22] Filed: May 2, 1984

Related U.S. Application Data

[62] Division of Ser. No. 326,536, Dec. 2, 1981, Pat. No. 4,466,597.

[51] Int. Cl.[4] ............... F16H 23/00; F16H 57/10
[52] U.S. Cl. ............................. 74/60; 74/411.5
[58] Field of Search ........................ 74/60, 411.5

[56] References Cited

U.S. PATENT DOCUMENTS

| | | | |
|---|---|---|---|
| 1,978,762 | 10/1934 | Reagan | 74/60 |
| 2,077,986 | 4/1937 | Cassani | 74/60 |
| 2,233,630 | 3/1941 | Miller | 74/60 |
| 2,294,281 | 8/1942 | Chadbourne | 74/60 |
| 2,706,384 | 4/1955 | Schott | 74/60 |
| 2,896,459 | 7/1959 | Jemison | 74/60 |
| 3,181,475 | 5/1965 | Thompson | 74/60 |
| 4,108,577 | 8/1978 | Brucken et al. | 74/60 |

*Primary Examiner*—Lawrence J. Staab
*Attorney, Agent, or Firm*—Maky, Renner, Otto & Boisselle

[57] ABSTRACT

An electro-mechanical direct drive valve servo system for an aircraft including a drive mechanism that couples the rotary output motion of a rotary force motor to linear motion at a sliding-type valve. The drive mechanism includes a pair of axially spaced rotary members connected to the force motor and a wobble member journaled between and canted by the rotary members with axial thrust bearings interposed between axially aligned opposed planar faces of the rotary and wobble members. A radial output arm on the wobble member is connected to the valve and is constrained for arcuate nutating movement whereby controlled rotation of the rotary member effects nutating movement of the wobble member and output arm which movement effects controlled linear movement of the valve. Additional control inputs such as braking and recentering function inputs are accommodated by the drive mechanism at its input end to take advantage of the mechanism's inherent gearing force ratio.

15 Claims, 5 Drawing Figures

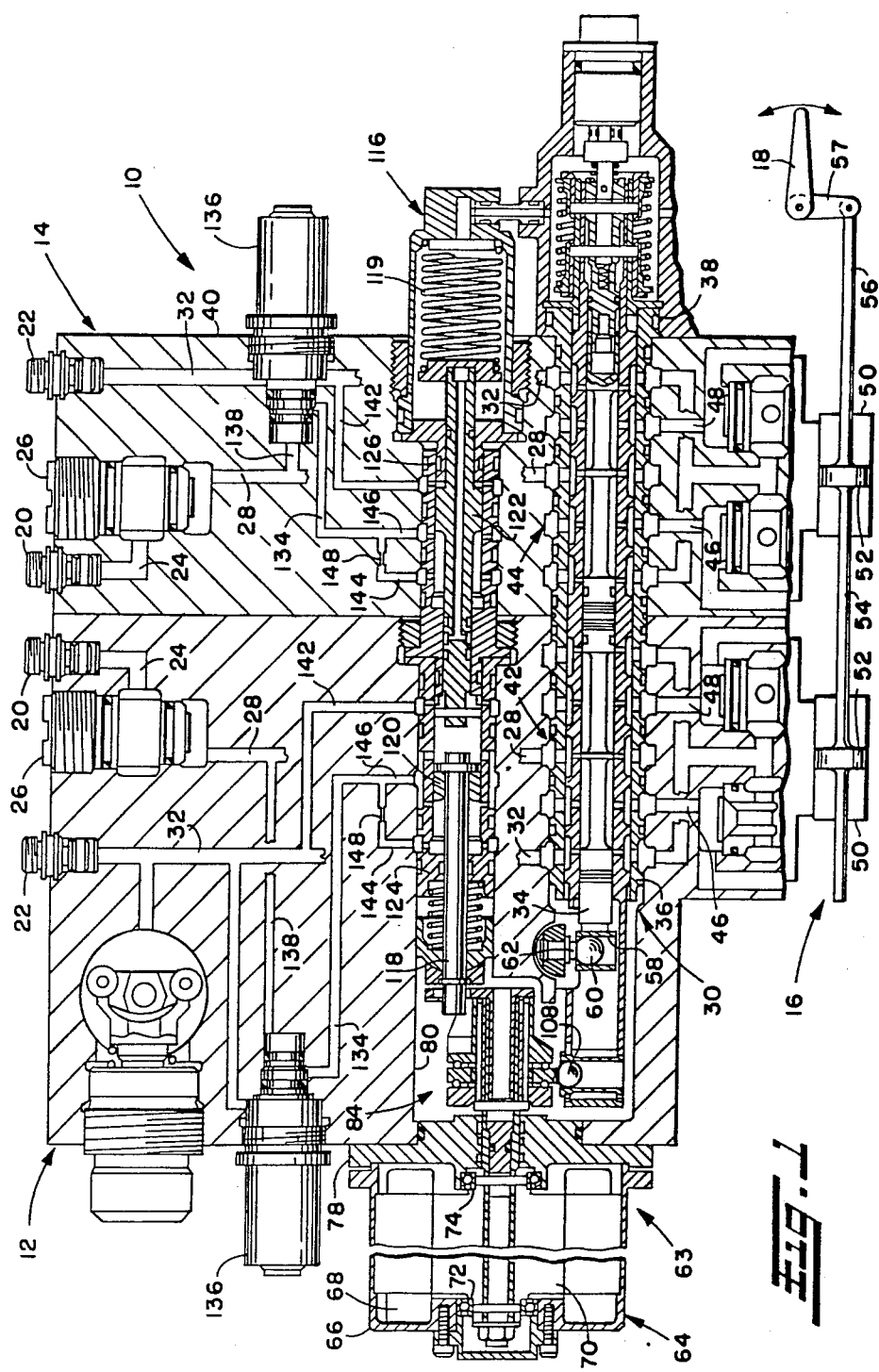

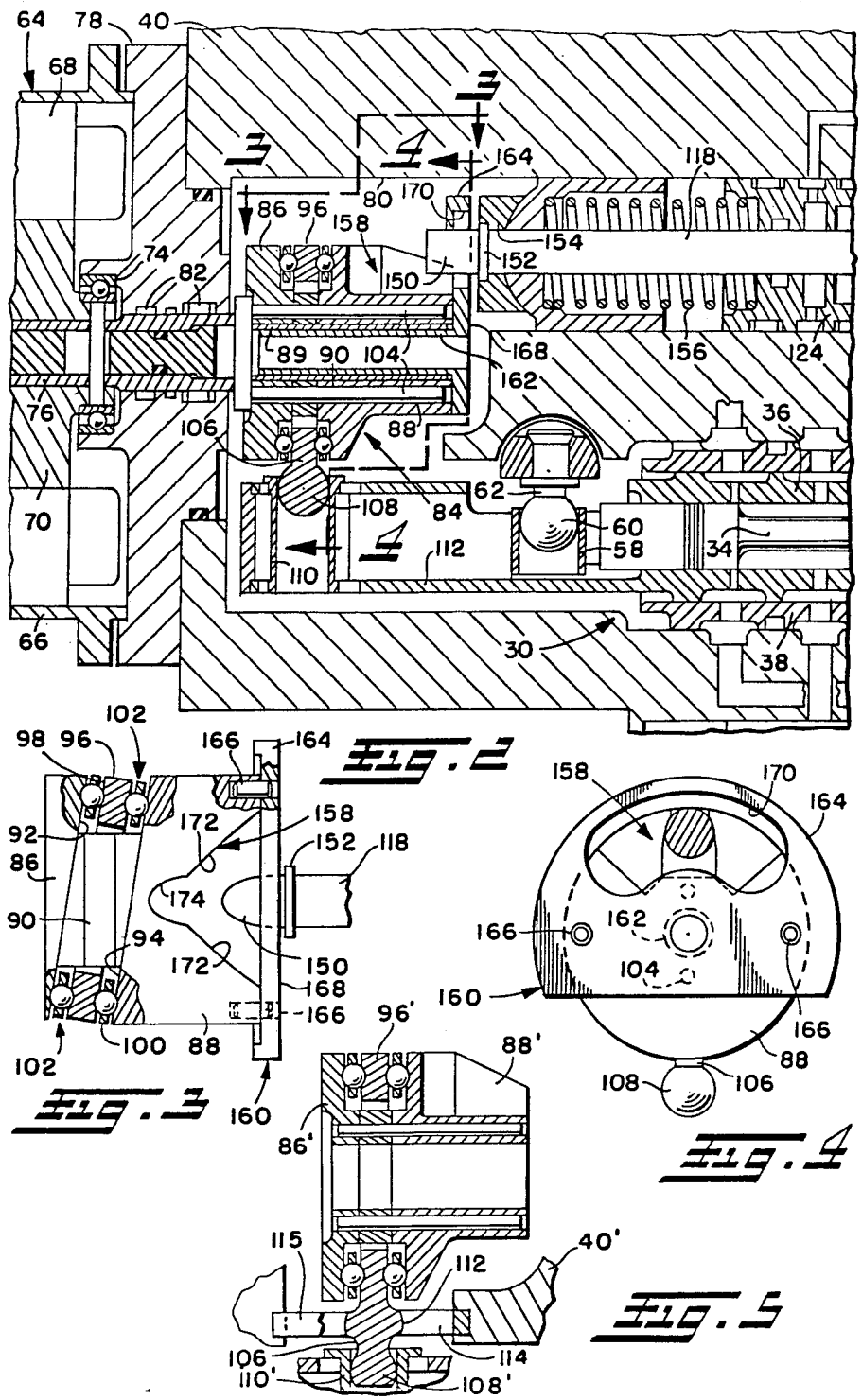

ELECTRO-MECHANICAL DIRECT DRIVE VALVE SERVO SYSTEM WITH ROTARY TO LINEAR VALVE DRIVE MECHANISM

This application is a division of application Ser. No. 326,536, filed Dec. 2, 1981, now U.S. Pat. No. 4,466,597, dated Aug. 21, 1984.

FIELD OF THE INVENTION

This invention relates generally to a fluid servo system, and more particularly to an aircraft flight control servo system. More specifically, this invention relates to an electro-mechanical control system, and still more specifically to a valve drive mechanism for use in such a system that couples a rotary motion control input, and auxiliary inputs, to a sliding-type servo valve.

BACKGROUND OF THE INVENTION

Fluid servo systems are used for many purposes, one being to position the flight control surfaces of an aircraft. In such an application, system redundancy is desired to achieve increased reliability in various modes of operation, such as in the control augmentation or electrical mode. In conventional electro-hydraulic systems, plural redundant electro-hydraulic valves have been used in conjunction with plural redundant servo actuators to assure proper position control of the control surface in the case of failure of one of the valves and/or servo actuators. Such added redundancy, however, results in a complex system with many additional electrical and hydraulic elements necessary to perform the various sensing, equalization, timing and other control functions. The system's complexity has reduced overall reliability, has increased package size and cost, and has imposed added requirements on the associated control electronics.

An alternative approach to the electro-hydraulic control system is the electro-mechanical control system wherein a force motor is coupled directly and mechanically to the main control servo valve. In this system, system redundancy has been accomplished by mechanical summation of forces directly within the multiple coil motor as opposed to the conventional system where redundancy is achieved by hydraulic force summing using multiple electro-hydraulic valves. If one coil or its associated electronics should fail, its counterpart channel will maintain control while the failed channel is uncoupled and made passive.

Various force motor configurations have been developed for directly driving the main servo valve in the control system. Basically, the force motor output is in the form of either linear or rotary motion. Linear motion obviously may be directly coupled to a sliding-type valve whereas rotary motion is more compatible with a rotary-type valve. For various reasons, it may be desirable to mate a force motor having a rotary output motion to a sliding-type valve. Accordingly, it would be advantageous and desirable to have a drive mechanism that couples a rotary force motor to a sliding-type valve.

It also would be advantageous and desirable to provide a rotary-to-linear drive mechanism that accommodates additional control inputs. This is particularly desirable in those servo systems wherein a manual input to the main servo valve is provided in the event that a mechanical reversion is necessary after multiple failures have rendered the electrical mode inactive. In known servo systems of this type, the manual input may operate upon the spool of the main servo valve whereas the electrical input operates upon a movable sleeve in the main servo valve. Upon rendering the electrical input inactive, it is necessary to move the valve sleeve to a neutral or centered position and to lock it against movement relative to the valve spool controlled by the manual input. Heretofore, this has been done by using a centering spring device which moves the valve sleeve to its centered or neutral position and a spring biased plunger that engages a slot in the valve sleeve to lock the latter against movement. The plunger normally is maintained out of engagement with the slot during operation in the electrical mode by hydraulic system pressure, and may have a tapered nose that engages a similarly tapered slot in the valve sleeve to assist in centering the valve sleeve. Such centering and locking arrangement, however, is subject to several drawbacks. For instance, in the event a chip or some other obstruction becomes lodged between the valve spool and sleeve or otherwise a high friction condition should occur therebetween, substantial reactive forces may be applied through the manual input path to the sleeve which may result in unseating of the plunger which in turn would render the manual mode inoperable.

Drive mechanisms for converting rotary motion to linear motion at valves for controlled operation of hydraulic actuators also are known. In U.S. Pat. No. 3,636,779, issued Jan. 27, 1972, such a mechanism is shown for controlling the elevation and azimuth of the turret of an ordnance vehicle. This mechanism utilizes an angular or radial contact type bearing to transmit a torsional moment from a rotating shaft to a nutating sleeve. The rotating shaft has a canted land on which the inner race of the bearing is fitted. The outer race of the bearing is fitted in the sleeve which has a radially extending guide shaft. The guide shaft extends into a guide slot therefor that constrains the guide shaft to arcuate movement in a plane passing through the rotating shaft's rotational axis. This accordingly causes the sleeve and guide shaft to wobble or nutate upon rotation of the rotating shaft. A linkage connected between the guide shaft and sliding valve provides for linear movement of the valve in response to the nutating movements of the sleeve and guide shaft.

While the valve drive mechanism disclosed in U.S. Pat. No. 3,636,779 may find particular utility in an ordnance vehicle, its use in an aircraft flight control system may not be particularly desirable for various reasons. For instance, the high resultant forces developed in the angular contact type bearing from the applied torsional moments limit the load carrying ability of the mechanism. Such high resultant forces also tend to spread apart the inner and outer races which has an adverse effect on the mechanism's stiffness. Moreover, to achieve control of bearing backlash or preload, the angular contact bearing must be specially fabricated or selected with no adjustments being available therein. In addition, such mechanism utilizes a semiflexible linkage to avoid undesirable valve plunger side loads and associated friction, which further adversely affects the mechanism's stiffness and load carrying ability.

OBJECTS OF THE INVENTION

With the foregoing in mind, it is a principal object of this invention to provide an electro-mechanical servo system wherein a valve drive mechanism converts the rotary motion of a rotary force motor to linear motion at a sliding-type servo valve.

It is another principal object of the invention to provide such a valve drive mechanism that is highly reliable and which is capable of supporting high loads with high stiffness.

It is still another object of this invention to provide such a valve drive mechanism wherein an essentially linear relationship exists between the rotary motion of the force motor and the linear motion at the servo valve over a desired working range of the servo valve.

It is yet another object of the invention to provide such a valve drive mechanism which eliminates potential misalignment and side load problems between the drive mechanism and linear motion servo valve without the need for a flexible member.

A further object of this invention is to provide gearing between the rotary force motor output and linear valve input which may easily accommodate gearing changes by relatively simple hardware changes such that a wide range of valve stroke/force relationships may be readily achieved.

A still further object of this invention is to provide a rotary to linear valve drive mechanism which is highly efficient, free from backlash and easily preloaded at assembly.

Another important object of this invention is to provide such a valve drive mechanism with gearing that accommodates additional control inputs, such as braking and re-centering function inputs, in an efficient manner and which takes advantage of any gearing force ratio, with resultant reduction in complexity and size of such additional control inputs.

Still another object of this invention is to provide such a valve drive mechanism that is capable of structurally supporting substantial reactive forces applied through a manual or other input without mechanical failure.

The foregoing and other objects of the invention will become more apparent from the following summary and detailed description.

SUMMARY OF THE INVENTION

To the achievement of these and other objects, a valve drive mechanism is provided for coupling the rotary output motion of a rotary force motor to linear motion at a sliding-type valve. The valve drive mechanism finds particular utility in an aircraft control servo system wherein the valve controls the flow of high pressure fluid to an actuator connected to an aircraft flight control surface.

Briefly, the valve drive mechanism comprises a rotary input member which is connected to and rotatably driven by the rotary force motor, and which has an axial driving face inclined or canted to its rotational axis. The rotary member is rotatable with respect to a wobble member journaled thereon, which wobble member has an axial driven face axially aligned with and in bearing engagement with the axial face of the rotary member, whereby the wobble member is canted by the rotary member with respect to the rotational axis of the rotary member. An output arm on the wobble member extends radially thereof, and means are provided for restraining the output arm for movement in a plane parallel to the rotational axis of the rotary member and for connecting the output arm to the valve for linear movement of the valve in response to the nutating arcuate movement of the output arm upon rotation of the rotary member. Because the engaged axial faces of the rotary member and wobble member are in axial alignment, the bearing surfaces transmitting the applied torsional moment are aligned in the direction of the developed reaction forces whereby high loads can be supported and adequate stiffness obtained. Moreover, an essentially linear relationship exists between the rotary input motion and linear output motion of the mechanism over a desired working range of the valve. In addition, a wide range of valve stroke/force relationships may be readily achieved by changing the cant of the wobble member and/or effective length of the output arm.

More specifically, the valve drive mechanism includes a pair of axially spaced rotary members that are connected to the force motor for common rotation about an axis parallel to the line of movement of the sliding-type valve. A wobble member in the form of a disc or plate is located between commonly inclined axial faces of the rotary members and canted thereby with respect to such rotational axis. Disposed between the axially aligned and opposed faces of the rotary members and wobble member are thrust ball bearings which effect the bearing engagement therebetween. The opposed faces of the rotary members and wobble member are provided with cooperating circular grooves which receive and retain the ball bearings. In this manner, the wobble member and bearings are supported between and by the rotary members. The spacing between the rotary members is precisely set by a spacer positioned therebetween at assembly whereby bearing backlash and preload may be precisely controlled at assembly. The spacer preferably is lapped to precisely the correct axial length to achieve a lightly preloaded condition without any backlash. The wobble member has a radially extending output arm which has a ball received in a socket in the linearly movable element of the valve whereby the arm is constrained for arcuate movement in a plane intersecting the line of movement of the valve element. Accordingly, rotation of the rotary members effects a nutating movement of the wobble member which movement effects linear movement of the valve element.

According to another aspect of the invention, the valve drive mechanism readily accommodates additional or auxiliary control inputs, such as braking and recentering function inputs. To this end, one of the rotary members is provided with a V-shape cam slot and a friction brake surface both radially offset from the rotational axis of such members. A cam plunger is movable into the cam slot in response to say electrical system failure in the aircraft control servo system. Initial movement of the cam plunger releases a brake shoe which engages the brake surface on the rotary member to hold the drive mechanism in its then existing position. The cam plunger continues to move into engagement with the sloping walls of the cam slot at a predetermined controlled rate to center the drive mechanism. During re-centering, the brake holding friction is overcome. When the cam plunger is fully engaged, it is received in a sharply shouldered slot or detent at the vertex of the V-shape cam slot to lock the drive mechanism in its neutral or centered position. When so locked at its input end, the valve drive mechanism establishes a high mechanical "disadvantage" against any external forces that would tend to back-drive the drive mechanism, thereby providing excellent holding or reactive capability.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a schematic illustration of a redundant multiple channel electro-mechanical servo system according to the invention;

FIG. 2 is an enlarged portion of FIG. 1 showing in section the rotary to linear valve drive mechanism of the servo system;

FIG. 3 is a top plan view of the drive mechanism of FIG. 2 as viewed from the line 3—3 thereof with parts of the drive mechanism shown partially in section;

FIG. 4 is a section through the drive mechanism of FIG. 2 taken substantially along the line 4—4 thereof; and FIG. 5 is a section through another embodiment of drive mechanism according to the invention.

DETAILED DESCRIPTION

Referring now in detail to the drawings and initially to FIG. 1, a redundant multiple channel electro-mechanical servo system is designated generally by reference numeral 10. The system 10 includes two similar hydraulic servo actuators 12 and 14 which are connected to a common output device such as a dual tandem cylinder actuator 16. The actuator 16 in turn is connected to a control member such as a flight control element 18 of an aircraft. It will be seen below that the two servo actuators normally are operated simultaneously to effect position control of the actuator 16 and hence the flight control element 18. However, each servo actuator preferably is capable of properly effecting such position control independently of the other so that control is maintained even when one of the servo actuators fails or is shut down. Accordingly, the two servo actuators in the overall system provide a redundancy feature that increases safe operation of the aircraft. The servo actuators seen in FIG. 1 are similar and for ease in description, like reference numerals will be used to identify corresponding like elements of the two servo actuators.

The Servo Actuators

The servo actuators 12 and 14 each have an inlet port 20 for connection with a source of high pressure hydraulic fluid and a return port 22 for connection with a hydraulic reservoir. Preferably, the respective inlet and return ports of the servo actuators are connected to separate and independent hydraulic systems in the aircraft. In the event one of the hydraulic systems fails or is shut down, the servo actuator coupled to the other still functioning hydraulic system may be operated to effect the position control function.

In each of the servo actuators 12 and 14, a passage 24 connects the inlet port 20 to a check valve 26. The check valve 26 in turn is connected by passage 28 to a servo valve 30. Another passage 32 connects the return port 22 to the servo valve 30.

The servo valve 30 includes a spool 34 which is longitudinally shiftable in a sleeve 36. The sleeve 36 in turn is longitudinally shiftable in the tubular insert 38 in the system housing 40. The spool and sleeve are divided into two fluidically isolated valving sections indicated generally at 42 and 44 in FIG. 1, which valving sections are associated respectively with the actuators 12 and 14 and the passages 28 and 32 thereof. Each valving section of the spool and sleeve is provided with suitable lands, grooves and passages such that either one of the spool or sleeve may be maintained at a nominal or centered position, and the other selectively shifted for selectively connecting the passages 28 and 32 of each servo actuator to passages 46 and 48 in the same servo actuator.

The passages 46 and 48 of both servo actuators 12 and 14 are connected to the dual cylinder tandem actuator 16 which includes a pair of cylinders 50. The passages 46 and 48 of each servo actuator are connected to a corresponding one of the cylinders at opposite sides of the piston 52 therein. If desired, anti-cavitation valves may be provided as indicated in the passages 46 and 48. The pistons 52 of the cylinders 50 are interconnected by connecting rod 54 and further are connected by output rod 56 to the control element 18 through linkage 57.

Accordingly, selective relative movement of the spool 34 and sleeve 36 simultaneously controls both valving sections 42 and 44 which selectively connect one side of each cylinder 50 to a high pressure hydraulic fluid source and the other side to fluid return for effecting controlled movement of the output rod 56 either to the right or left as seen in FIG. 1. In the event one of the servo actuators fails or is shut down, the other servo actuator will maintain control responsive to selective relative movement of the spool and sleeve.

The relatively shiftable spool 34 and sleeve 36 provide for two separate operational modes for effecting the position control function. The spool, for example, may be operatively associated with a manual operational mode while the sleeve is operatively associated with a control augmented or electrical operational mode. In the manual operational mode, spool positioning may be effected through direct mechanical linkage to a control element in the aircraft cockpit. As seen in FIG. 1, the spool may have a cylindrical socket 58 which receives a ball 60 at the end of a crank 62. The crank 62 may be connected by a suitable mechanical linkage system to the aircraft cockpit control element. For a detailed description of such a mechanical linkage system, reference may be had to U.S. Pat. No. 3,956,971 entitled "Stabilized Hydromechanical Servo System", issued May 18, 1976.

Normally, the manual control mode will remain passive unless a failure renders the electrical mode inoperable. During operation in the electrical mode, the spool 34 is held in a neutral or centered position while the sleeve 36 is controllably shifted to effect the position control function.

The Valve Drive Assembly 63

Controlled shifting of the valve sleeve 36 is effected by a valve drive assembly 63 including a rotary force motor 64 which is responsive to electrical command signals received from the aircraft cockpit. The force motor 64 preferably has redundant multiple parallel coils so that if one coil or its associated electronics should fail, its counterpart channel will maintain control. Preferably, suitable failure monitoring circuitry is provided to detect when and which channel has failed, and to uncouple or render passive the failed channel.

Referring now additionally to FIG. 2, the force motor 64 can be seen to include a motor housing 66 which is secured to the system housing 40 that contains the servo valve 30. The motor stator 68 is fixed in the motor housing whereas the rotor 70 is journaled by bearings 72 and 74 in the motor housing. Preferably, the bearings 72 and 74 are of the radial and thrust type and are slightly preloaded for prevention of axial and radial shifting of the rotor in the motor housing.

The rotor 70 has a central axial bore in which the motor shaft 76 is fixed. The motor shaft 76 extends through the base plate 78 of the motor housing into a chamber 80 in the system housing 40. Suitable seals 82 are provided in the base plate 78 to preclude passage of hydraulic fluid from the chamber 80 into the interior of the motor 64.

a. Valve Drive Mechanism 84

The shaft 76 of the force motor 64 is coupled to the servo valve sleeve 36 by a drive mechanism 84 which is contained within the chamber 80 in the system housing 40. As best seen in FIGS. 2 and 3, the drive mechanism 84 includes a pair of rotary input members 86 and 88 which are secured on a tubular shaft extension 89 connected to the motor shaft 76 for rotation therewith about the shaft's rotational axis. The rotary members 86 and 88 are axially spaced apart by a spacer 90 and have opposed parallel axial end faces 92 and 94, respectively, which are commonly inclined or canted at an angle (other than 90°) to the rotational axis of the motor shaft as seen in FIG. 3. Journaled between the axial faces 92 and 94 is a disc or plate-like wobble member 96 which has parallel axial end faces 98 and 100 respectively in bearing engagement with the faces 92 and 94 of the rotary members. Such bearing engagement preferably is obtained by annular ball thrust bearings 102 disposed between the opposed faces of the wobble plate and rotary members. The balls of the bearings are received and retained in circular grooves in the faces of the wobble plate and rotary members. In this manner, the wobble member and the bearings are supported between and by the rotary members.

The drive mechanism 84 is maintained in the above described assembled relationship by dowel pins 104 which are press fitted in bores extending through the rotary members 86 and 88 and spacer 90. When so assembled, the rotary members are maintained in tight engagement with the spacer 90. It should be noted that by carefully selecting the thickness of the spacer, i.e., the axial length of the spacer, such as by lapping its axial end faces, the bearing clearance or preload may be precisely set at a predetermined amount at assembly. Preferably, the spacer is lapped to precisely the correct axial length to achieve a slightly preloaded condition without backlash.

The wobble member 96 can be seen in FIG. 2 to have a radially extending output arm 106. At the radially outermost end of the arm 106, a ball 108 is integrally formed or secured thereto. This ball is closely fitted in a cylindrical socket 110 provided in an axial extension 112 on the servo valve sleeve 36. Because the servo valve sleeve is restrained for linear movement along its longitudinal axis in the housing insert 38, which axis is parallel to the rotational axis of the rotary members 86 and 88, the output arm is constrained for arcuate movement in a plane parallel to such longitudinal axis of the sleeve. As a result, the wobble member 96 is restrained against rotation along with the rotary members 86 and 88 as the latter are rotated by the force motor shaft 76 in response to a command input to the force motor 64. Accordingly, the wobble member and arm 106 will nutate about an axis perpendicular to the longitudinal axis of the sleeve and also the rotational axis of the rotary members. During such movement of the arm, the ball 108 at the end thereof will bear against the sides of the socket 110 to generate a force along the longitudinal axis of the sleeve for effecting linear movement of such sleeve. The rise and fall of the ball during such arcuate movement will be accommodated by the socket, such ball sliding along the socket in a direction normal to the longitudinal axis of the sleeve. Preferably, there is minimal frictional resistance to such rise and fall motion of the ball to avoid valve sleeve side loads.

To further reduce valve sleeve side loads, the output arm 106 may be provided with a guide ball 112 which is constrained by laterally spaced parallel guide lands 114 and 115 as illustrated in FIG. 5 wherein primed reference numerals designate elements corresponding generally to those identified above by the same unprimed reference numerals. The guide lands 114 and 115, which may be fitted in the housing 40, extend in a direction parallel to the longitudinal axis of the valve sleeve 36, and accordingly constrain movement of the ball 112, and hence the output arm 106, against movement in any direction other than in a plane parallel to such axis. In addition, the guide lands 114 and 115 bear any developed lateral side loads and not the valve sleeve.

A linear relationship essentially exists between the rotary input motion of the drive motor shaft 76 and the linear motion of the valve sleeve 36 generally within plus or minus 40° of rotation of the motor shaft from a center or neutral position. It also should be noted that by changing the angle of inclination of the wobble member 96 with respect to the axis of the motor shaft and/or the effective radial length of the output arm 106, a wide range of valve stroke/force relationships may be achieved without redesign of the basic drive mechanism configuration and hence with a minimum of hardware changes.

b. The Valve Centering and Lock Assembly 116

In the event of failure in the electrical mode, an auxiliary input to the drive mechanism 84 such as the valve centering and lock assembly designated generally by reference numeral 116 in FIG. 1 is provided for controlling failure transients and for positioning the servo valve sleeve 36 at its centered or neutral position. The centering and lock assembly 116 includes a cam plunger 118 which is biased by a plunger spring 119 to the left in FIG. 1. The cam plunger 118 includes pistons 120 and 122 which are positioned in cylinders 124 and 126. The cylinders 124 and 126 are in the form of inserts received in a bore in the housing 40 and are associated respectively with the servo actuators 12 and 14. The hydraulic circuitry in the servo actuators associated with each piston and cylinder is similar and for ease in description, like reference numerals will be used to identify corresponding elements of such circuitry.

The left side of each cylinder 124, 126 is connected by a passage 134 to a solenoid-operated shut-off valve 136. In the energized position of the shut-off valve 136, fluid communication is established between the passage 134 and a passage 138 that connects the shut-off valve to the passage 28. When de-energized upon failure in the electrical operational mode, the shut-off valve connects the passage 134 to the return passage 32.

Accordingly, energization of each shut-off valve 136 supplies high pressure fluid to the left side of the respective cylinders 124, 126. This forces the respective pistons 120, 122 to the right which in turn forces the cam plunger 118 to the right against the plunger spring 119. A passage 142 is connected to the right side of each cylinder 124, 126 for returning fluid therein to the return passagee 32 to permit such movement of the pistons to the right.

It should be noted that the end of each passage 134 is bifurcated into two passages 144 and 146. Each passage 144 is connected to the far left side of the respective cylinders 124, 126, and has therein a centering rate control or metering orifice 148 for a purpose which will become more apparent below. The other passage 146 is connected more centrally to the respective cylinder and is open to the left side of the respective pistons 120, 122 only when the cam plunger 118 is in or near its retracted position.

As best seen in FIGS. 2 and 3, the cam plunger 118 at its left end has a rounded V-shape nose 150 and a stop shoulder or collar 152 axially to the right of the nose. When the cam plunger is in its retracted position, the stop collar 152 engages and restrains a brake shoe 154 mounted for sliding movement on the cam plunger. The brake shoe 154 is biased to the left by a brake spring 156 positioned between the brake shoe and the cylinder insert 124. The nose 150 and brake shoe 154 are adapted to engage respectively a cam slot 158 in the outer rotary member 88 and brake member 160 of the drive mechanism 84.

Referring now additionally to FIG. 4, the brake member 160 has an axially extending cylindrical portion 162 fitted into the interior of the tubular shaft extension 89. The brake member further has a radially extending brake plate 164 which is substantially radially offset from the rotational axis of the shaft extension 89. The plate 164 abuts the end of the tubular end portion of the outer rotary member 88 and is secured thereto for common rotation by pins 166. Such plate has an axially outer brake surface 168 adapted for frictional engagement with the brake shoe 154, and an opening or window 170 aligned with the cam slot 158 formed in the outer rotary member 88.

The cam slot 158 is radially offset from the rotational axis of the rotary member 88 and opens axially in longitudinal alignment with the cam plunger 118. The cam slot has sloping side walls 172 which give the slot a V shape. At the vertex of the slot, the side walls slope sharply and substantially axially to form a sharply shouldered detent 174 having a shape generally corresponding to the shape of the nose 150 of the cam plunger. It should be noted that the detent is circumferentially positioned in the rotary member such that when the plunger nose is received and seated in the detent, the servo valve sleeve 36 will be in its centered or neutral position and locked therein by reason of the sharp or axial shoulders of the detent that preclude the plunger nose from being cammed out of the detent.

Operation

During normal operation of the system and the electrical mode, each shut-off valve 136 is energized. This supplies hydraulic pressure to the left side of each piston 120, 122 thereby retracting the cam plunger 118 to the right to its retracted position seen in FIG. 1. As the cam plunger nears its retracted position, the stop collar 152 engages the brake shoe 154 and retracts it out of contact with the brake plate 164. Accordingly, the valve centering and lock assembly 116 is disengaged to allow controlled positioning or shifting of the valve sleeve 36 by the valve drive mechanism 84 in response to electrical command signals received from the aircraft cockpit.

In the event of failure in both channels of the electrical mode, both shut-off valves 136 are de-energized. This connects the left side of the pistons to return pressure. Initially, high pressure fluid will flow out of the left side of each cylinder 124, 126 through the nonrestricted passage 146 to the return port 22 for initial rapid movement of the cam plunger 118 to the left in FIG. 1, such movement being effected by plunger spring 119. This initial rapid movement causes immediate release of the brake shoe 154 which is urged by the brake spring 156 into frictional engagement with the brake plate 164. The brake holding friction will maintain the drive mechanism, and hence the servo valve, in its then existing position.

After such initial rapid movement of the cam plunger 118, flow through each passage 146 will be precluded by its respective piston 120, 122 whereupon flow from the respective chamber 124, 126 will then pass through the respective passage 144 which contains the metering orifice 148. The cam plunger will then move to the left at a predetermined controlled rate as established by the metering orifice and the plunger spring 119. As the cam plunger moves to the left, it will move into the cam slot 170 and into engagement with a side wall 172 thereof to effect centering of the drive mechanism and thus the servo valve. During re-centering, the brake holding friction is overcome. When the cam plunger is fully engaged in the detent 174 in the cam slot, the drive mechanism is locked in its neutral position. With the valve sleeve 36 thusly centered and locked, manual operation may be effected through the manual input which selectively controls positioning of the spool 34 with respect to the centered sleeve for effecting the position control function.

From the foregoing, it can now be seen that the drive mechanism 84 of the present invention is of relatively simply construction while providing many advantages. For instance, the drive mechanism exhibits very good linearity between the rotary motion of the force motor 64 and the sliding motion at the servo valve sleeve 36 over a desired working range of the valve. In addition, the drive mechanism provides gearing between the force motor output and valve input which easily accommodates gearing changes by relatively simple hardware changes such that a wide range of valve stroke/force relationships may be achieved without re-design of the basic motor/valve configuration. For instance, by changing the angle of the canted faces of the rotary members 86 and 88 with respect to their rotational axis and/or the radial length of the output arm 106, a wide range of gearing may be readily obtained.

The drive mechanism with its inherent gearing provides convenient means for accommodating other control inputs, such as the described braking and recentering device, while taking advantage of the gearing force ratio. This reduces the complexity and size of such other control inputs. That is, the braking and centering functions may be accomplished at the input end of the gearing thereby achieving considerable mechanical advantage to accomplish the braking and centering functions smoothly. Moreover, when locked, the holding or reactive capability of the mechanism utilizes the input end of the gearing to establish a high mechanical "disadvantage" against any external forces that would tend to backdrive the mechanism during operation in the manual mode.

The drive mechanism also is freed from inherent backlash and may be pre-loaded at assembly without the need for specially selected and designed components. Precise control over valve position may be achieved as well as high mechanical stiffness.

Although the invention has been shown and described with reference to preferred embodiments, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A rotary to linear drive mechanism comprising a rotary input member having an axial planar face inclined to the rotational axis of said rotary input member, a wobble member journaled on said rotary input member for rotation relative to said rotary input member, said wobble member having an axial planar face in axial alignment and bearing engagement with the axial face of said rotary input member, means restraining said wobble member for effecting nutating movement about an axis normal to said rotational axis, means for connecting said wobble member to a linearly movable element for effecting linear movement of said element in response to nutating movement of said wobble member upon rotation of said rotary input member, and auxiliary control means responsive to a control input for initially braking rotation of said rotary input member at a controlled rate to a neutral position.

2. The mechanism of claim 1 including axial thrust bearing means axially interposed between the axial faces of said rotary input and wobble members for effecting the bearing engagement therebetween.

3. The mechanism of claim 2 wherein said axial faces have opposed circular grooves and said bearing means includes a plurality of ball bearings received in said grooves.

4. The mechanism of claim 1 wherein said rotary and wobble members have opposed axial faces in bearing engagement, and means are provided for adjusting the spacing between said rotary input members whereby backlash and preload may be controlled.

5. The mechanism of claim 4 wherein said last mentioned means comprises a spacer of precisely determined length interposed between said rotary members.

6. The mechanism of claim 1 wherein said auxiliary control means includes a cam surface connected to said rotary input member radially offset from such rotational axis, a cam plunger, and means for holding said plunger in a retracted position out of engagement with said cam surface and for moving said cam plunger in response to such control input from such retracted position into engagement with said cam surface for effecting rotation of said rotary input member to such neutral position.

7. The mechanism of claim 6 wherein said means for holding and moving includes a fluid cylinder and spring, respectively.

8. The mechanism of claim 6 wherein said auxiliary control means further includes a friction brake surface connected to said rotary input member radially offset from such rotational axis, a brake shoe, and means for moving said brake shoe into engagement with said brake surface for braking rotation of said rotary input member.

9. The mechanism of claim 8 wherein said cam plunger includes means for holding said brake shoe disengaged from said brake surface when said cam plunger is in such retracted position and for releasing said brake shoe upon initial movement of said cam plunger from such retracted position.

10. The mechanism of claim 9 wherein said brake shoe is mounted for sliding movement on said cam plunger, and said means for holding said brake shoe includes a stop on said plunger.

11. The mechanism of claim 9 wherein said means for moving said cam plunger includes means for initially moving said cam plunger at a rapid rate out of its retracted position to release said brake shoe and then at a controlled rate into engagement with said cam surface.

12. The mechanism of claim 11 wherein said last mentioned means includes spring means for biasing said cam plunger into engagement with said cam surface, a hydraulic cylinder for holding said cam plunger in its retracted position against said spring means, and means for exhausting said cylinder at a rapid rate and then at a controlled rate through a metering orifice.

13. The mechanism of claim 6 wherein said cam plunger has a nose, and said cam surface is in the form of a V-shape slot which has a sharply shouldered detent at its vertex for receipt of said nose when said rotary input member is in such neutral position.

14. The mechanism of claim 1 wherein said means for connecting said wobble member to said linearly movable element comprises a radial arm on said wobble member, means for restraining said arm for movement in a plane parallel to such rotational axis, and means connecting said arm to said linearly movable element for linear movement of said linearly movable element in response to nutating movement of said arm upon rotation of said rotary input member, said means connecting including a socket in said linearly movable element and a ball on the axial outer end of said arm received in said socket.

15. The mechanism of claim 14 wherein said means for restraining includes spaced guide lands extending parallel to such rotational axis and another ball on said arm radially inwardly of said first mentioned ball, said another ball being constrained by said guide lands for movement in a plane parallel to such rotational axis.

* * * * *